May 23, 1961 R. BINDER 2,985,273
RESILIENT CLUTCH CONSTRUCTION
Filed Sept. 29, 1958 3 Sheets-Sheet 1
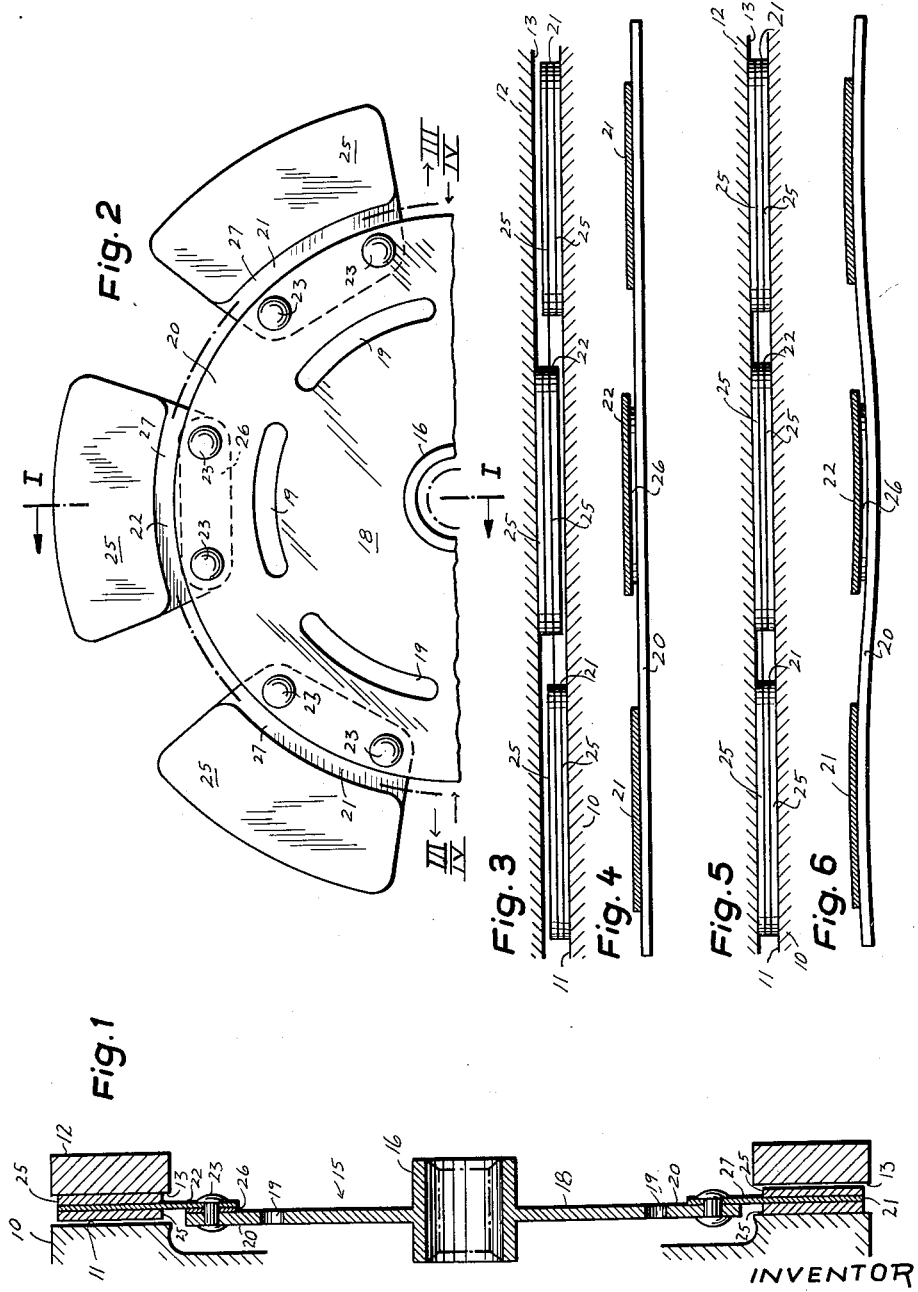
INVENTOR
RICHARD BINDER
by
Richardson, David & Nordon
his Attorneys

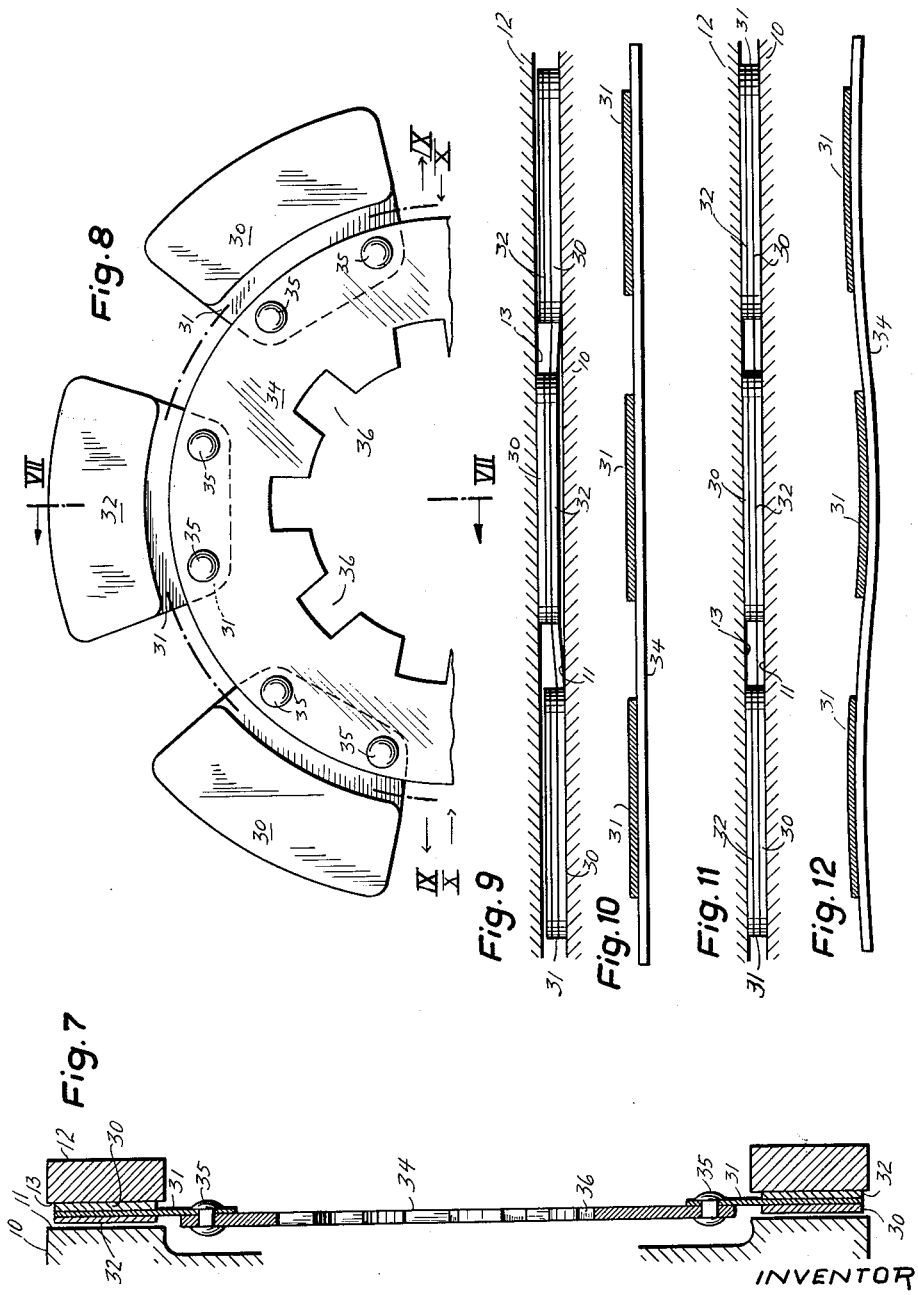

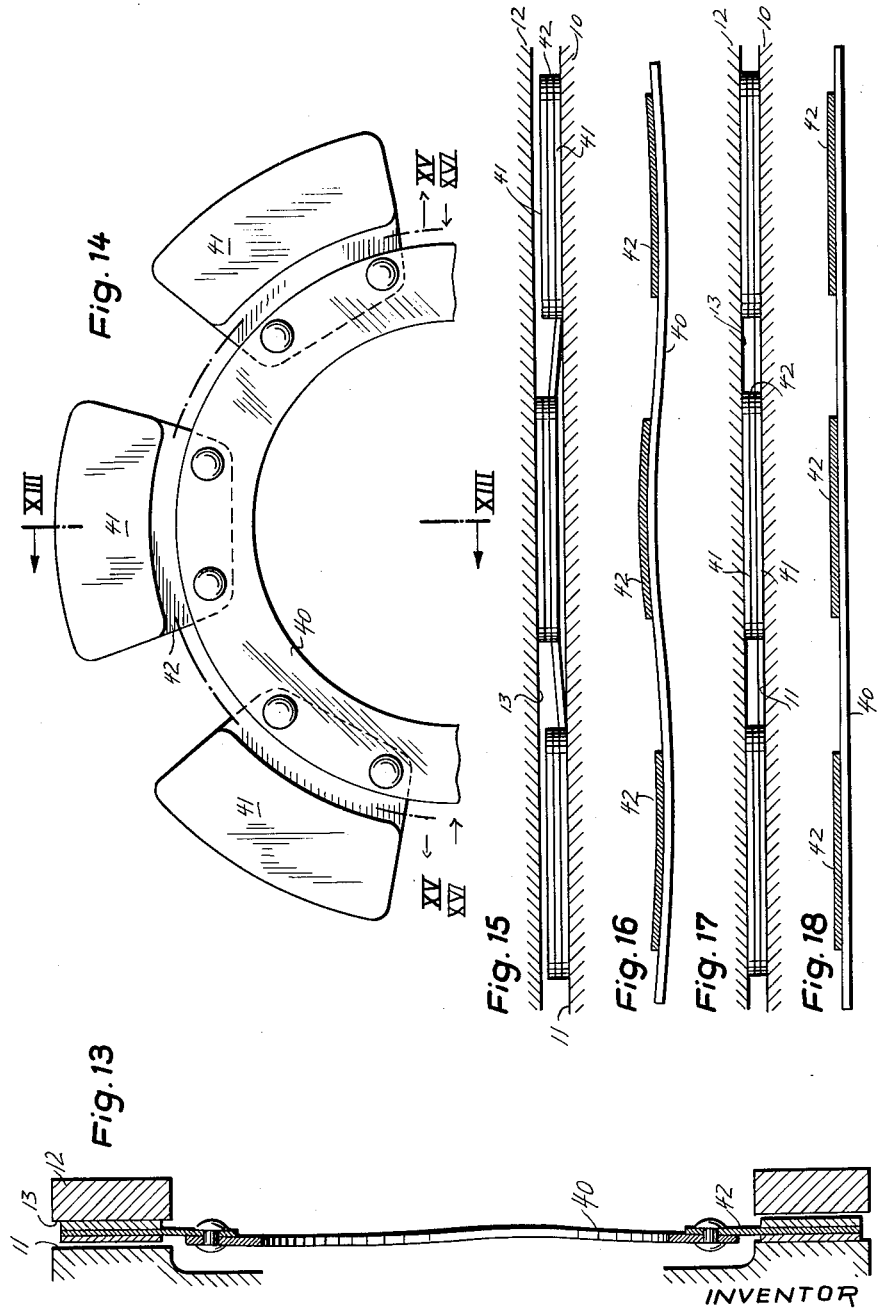

United States Patent Office 2,985,273
Patented May 23, 1961

2,985,273

RESILIENT CLUTCH CONSTRUCTION

Richard Binder, Schweinfurt (Main), Germany, assignor to Fichtel & Sachs A.G., Schweinfurt (Main), Germany, a corporation of Germany Filed Sept. 29, 1958, Ser. No. 764,033

Claims priority, application Germany Oct. 2, 1957

2 Claims. (Cl. 192—68)

The present invention relates to clutches and more particularly to a resilient form of clutch construction wherein the clutch is provided with ceramic or sintered metallic friction facings which are formed directly on supporting carrier members, the friction facings being gradually and resiliently pressed into engagement with cooperating friction surfaces of the other clutch member.

A feature of the invention resides in the provision of resilient supporting means which maintains alternate ones of the active surfaces of friction facings in axially spaced parallel planes normal to the rotational axis of the clutch with the clutch disengaged, the active surfaces of the friction facings gradually becoming coplanar when progressively squeezed between two cooperating flat clutch surfaces which simultaneously engage all of the friction facings.

An important feature of the invention involves the provisions of cooling areas intermediate the friction facings and the resilient support whereby the application of high frictionally generated operating temperatures to the resilient support is avoided.

Briefly, the invention comprises a driving unit including two cooperating clutch members having flat friction surfaces, one of the clutch members being axially displaceable for engagement and disengagement of the clutch. Interposed between the flat friction surfaces is an even number of regularly arranged segmental supporting members. Two friction facings are adhered directly to opposite sides of each segmental supporting member so that the active surface of each friction facing is engageable by friction surface of one of the clutch members. The supporting members are secured to the periphery of a resiliently deformable circular member which is driven when the driving clutch members engage the friction facings.

In one embodiment of the invention, all of the friction facings are of equal thickness and the segmental supporting members are riveted to the resilient driven member. The supporting members and driven member are flat. Spacers are provided so that alternate supporting members are axially offset from the supporting member. The active surfaces of the friction facings are thus disposed in axially spaced planes normal to the rotational axis of the clutch when the clutch is disengaged. When the clutch is engaged, the active surfaces of the friction facings are pressed into coplanar relationship, the resilient driven member being deformed accordingly.

In an another embodiment of the invention, the supporting members and disc are flat. The friction facings, however, are thicker at one side of each supporting member than at the other. As a result, with the clutch disengaged, the active surfaces of the friction facings lie in axially spaced planes and are rendered coplanar by the pressure of clutch engagement.

In a third embodiment of the invention, the resilient disc is originally permanently deformed in an undulatory configuration so that the active surfaces of alternate friction facings are yieldingly maintained in axially spaced planes. The pressure of clutch engagement deforms the disc from its undulatory shape into a relatively flat condition.

Various objects, additional features and advantages of the invention will become apparent upon reading the following specification together with the accompanying drawing forming a part thereof.

Referring to the drawing:

Figure 1 is a fragmentary side elevational view in axial section taken along the line I—I of Fig. 2, diagrammatically illustrating a clutch embodying the invention, the clutch being shown in its disengaged condition.

Figure 2 is a fragmentary end view of the clutch disc of Fig. 1 together with the supporting members and friction facings.

Figure 3 is a developed view in cylindrical section taken along the semicircular arc III—III in Fig. 2 looking radially outwardly in the direction of the arrows with the clutch disengaged.

Figure 4 is a developed view in cylindrical section taken along the semicircular arc IV—IV in Fig. 2, looking radially inwardly in the direction of the arrows with the clutch disengaged.

Figure 5 is similar to Fig. 3 except that the clutch is shown in its engaged condition.

Figure 6 is similar to Fig. 4 except that the clutch is shown in its engaged condition.

Figures 7 through 12 are similar to Figs. 1 through 6, respectively, illustrating another embodiment of the invention wherein the friction facings at opposite sides of each supporting member are of unequal thicknesses.

Figures 13 through 18 are similar to Figs. 1 through 6, respectively, illustrating a third embodiment of the invention wherein the resilient driven member is originally permanently deformed in an undulatory configuration and becomes flattened when the clutch is engaged.

Referring to Fig. 1, there is a driving clutch member 10 which may be a portion of the flywheel of an internal combustion engine, for example. The driving clutch member 10 is provided with a flat smooth annular friction surface 11, the plane of which is perpendicular to the rotational axis of the clutch. Cooperating with the clutch member 10 is a further driving clutch member 12 which is provided with a smooth flat annular friction surface 13 confronting the friction surface 11. The plane of the friction surface 13 is parallel to and axially spaced from the plane of the friction surface 11. The further clutch member 12 is axially movable with respect to the clutch member 10 and is connected by conventional means (not shown) for rotation as a unit with the driving clutch member 10. Axial movements of the further clutch member 12 are produced by conventional means such as a clutch pedal (not shown) for selectively engaging and disengaging the clutch.

Arranged coaxially with the driving clutch members 10 and 12 is a driven member designated generally as 15. The driven clutch member 15 comprises a central hub portion 16 adapted to be fixed to a driven shaft (not shown) which extends to the transmission of an automotive vehicle, for example.

Integrally formed on the hub 16 is a resiliently deformable clutch disc 18. The disc 18 has a circularly extending series of arcuate slots 19 formed therein inwardly of its circumference for increasing the flexibility of its peripheral portion 20. A series of flat segmental supporting members alternately designated as 21 and 22 is secured to the peripheral portion 20 of the disc 18 by a circle of rivets 23. Friction facings 25 are directly adhered to opposite sides of each of the supporting members 21 and 22.

The friction facings 25 may be formed of bronze which is sintered directly onto its respective supporting member 21 or 22. If formed of asbestos, each friction facing 25 is bonded, pressed, or otherwise directly adhered to one side of each supporting member 21 or 22. The alternate supporting members 22 are axially displaced with respect to the remainder of the supporting members 21 by spacers 26. All of the friction facings 25 are of the same thickness.

In operation, the friction facings 25 assume the staggered arrangement shown in Figs. 1 and 3 with the clutch disengaged. With the clutch disengaged, the friction facings 25 carried by the supporting members 22 which are provided with spacers 26, are slightly spaced from or lightly engage the friction surface 13 of the further driving clutch member 12. The friction facings 25 which are carried by the other supporting members 21 are slightly spaced from or lightly engage the confronting friction surface 11 of the driving clutch member 10. The corresponding active surfaces of the friction facings 25 which cooperate with the same friction surface 11 or 13 thus lie in axially spaced planes.

When the clutch is engaged, the further driving clutch member 12 moves axially from the position shown in Figs. 1 and 3 to the position shown in Fig. 5. The friction facings 25 are pressed by the friction surfaces 11 and 13 so that their corresponding active surfaces become coplanar for all of the friction facings 25. With the clutch engaged, the friction facings assume the position shown in Fig. 5. This causes the peripheral portion 20 of the disc 18 to be deformed in an undulatory manner as shown in Fig. 6. Initially, with the clutch disengaged, the peripheral portion 20 is flat as shown in Fig. 4. During the progressive resilient deformation of the peripheral portion 20 of disc 18, the pressure of frictional engagement between the active surfaces of the friction facings 25 and the friction surfaces 11 and 13 increases gradually so that abrupt clutch engagement is avoided.

When the clutch is slipping, the friction facings 25 become heated. In the case of sintered bronze facings which have high thermal conductivity, there is a tendency to transmit heat to the disc 18 and particularly its resilient peripheral portion 20. The friction facings 25 do not extend inwardly to the peripheral portion 20 but are spaced radially outwardly therefrom so that there is a free heat dissipating area 27 on each of the supporting members 21 and 22. In this manner, overheating of the springy peripheral portion 20 of the disc 18 is avoided and its elasticity is retained.

Referring to the modified form of the invention shown in Figs. 7 to 12, each of the friction facing 30 on one side of each supporting member 31 is thicker than the friction facing 32 on its other side. The thicker friction facings 30 are all of the same thickness and the thinner friction facings 32 are likewise all of the same thickness as well as the supporting members 31. As a result, the overall thickness of the two friction facings carried by each of the supporting members 31 is the same and their active surfaces are simultaneously evenly engaged between the friction surfaces 11 and 13 of the driving clutch members 10 and 12, respectively, when the clutch is in its engaged condition as illustrated in Fig. 11. When the clutch is disengaged, however, as shown in Fig. 9 the active surfaces of the thicker friction facings 30 are slightly spaced from or lightly engage the friction surfaces 11 and 13 with alternate friction facings 30 engaging the friction surface 11 and with the active surfaces of the friction facings which are disposed intermediate those which engage the friction surface 11 engaging the confronting friction surface 13.

The supporting members 31 are secured to a resilient driven ring member 34 by rivets 35. The inner periphery of the ring member 34 has notches 36 formed therein which enhance its flexibility. The ring member 34 is adapted to be connected to the driven shaft (not shown) by a spider or other suitable connecting device which is keyed to the driven shaft and which has been omitted from Figs. 7 and 8 for simplicity of illustration. When the clutch is disengaged, the flexible ring member 34 is flat, as shown in Fig. 10. When the clutch is engaged, the ring member 34 assumes an undulatory configuration as shown in Fig. 12. The active surfaces of the friction facings are thus progressively engaged by the friction surfaces with gradually increasing pressure during engagement of the clutch.

In the modified form of the invention illustrated in Figs. 13 to 18, the resilient supporting ring 40 is originally given a permanent undulatory configuration as shown in Fig. 16 prior to its assembly in the clutch. After assembly, with the clutch disengaged, the undulatory configuration of the supporting ring 40 causes the active surfaces of the friction facings 41 of alternate supporting members 42 to be slightly spaced from or to engage lightly the friction surface 11 and the active surfaces of the remaining alternate friction facings to be slightly spaced from or in light engagement with the confronting friction surface 13 as shown in Fig. 15. When the clutch is engaged, as shown in Fig. 17, the pressure applied to the friction facings 41 causes the resilient ring member 40 to become flattened as shown in Fig. 18. In Figs. 13 to 18, the friction facings 41 are all of equal thickness as in the case of Figs. 1 to 6, described above. The original permanent undulatory configuration of the resilient ring member 40, however, avoids the need for the spacers 26 used in Figs. 1 to 6. The resilient ring member 40 is connected to the driven shaft (not shown) by suitable connecting means which have been omitted from the drawing for simplicity of illustration. The operation of the clutch of Figs. 13 to 18 is similar to that of the embodiment of Figs. 1 to 6.

It will be apparent to those skilled in the art that various modifications may be made in the embodiments of the invention which have herein been illustratively shown and described without departing from the spirit and scope of the invention as defined in the appended claims.

What is claimed is:

1. A revoluble friction clutch comprising two driving members rotating as a unit and having spaced parallel flat confronting annular friction surfaces, at least one of said driving members being axially movable to vary the spacing between said friction surfaces for selectively engaging and disengaging said clutch, said friction surfaces being concentric with the rotational axis of the clutch and lying in spaced planes perpendicular to said rotational axis, an axially resilient circular driven plate member concentric with said rotational axis, said plate having arcuate slots formed inwardly of its circumference a number of flat supporting members individually connected by fasteners to said driven plate member and extending radially outwardly therefrom, the outer portions of all of said supporting members lying between said friction surfaces, a plurality of sintered friction facings each disposed on one side of one of said outer portions of one of said supporting members and integrally fused thereto for engagement with one of said friction surfaces during engagement of said clutch, and a plurality of flat spacer members respectively inserted between only certain ones of said supporting members and the driven member and secured thereto by said fasteners so that the active surfaces of certain ones of said friction facings, with said clutch disengaged, lie closer to the friction surface with which they cooperate than the remainder of the active surfaces which cooperate with the same friction surface, all of said active surfaces which cooperate with the same friction surface being progressively pressed into coplanar relationship by said driving members during the course of engagement of said clutch.

2. A clutch according to claim 1, wherein said driven member is flat and all of said friction facings are of equal thickness, said spacing members being disposed between only alternate ones of said supporting members and said driven member.

References Cited in the file of this patent

UNITED STATES PATENTS

| | | |
|---|---|---|
| 1,603,295 | Ruesenberg | Oct. 19, 1926 |
| 1,613,669 | Maynard | Jan. 11, 1927 |
| 2,175,418 | Wales | Oct. 10, 1939 |
| 2,201,340 | Hunt | May 21, 1940 |
| 2,277,603 | Nutt et al. | Mar. 24, 1942 |
| 2,299,028 | Nutt et al. | Oct. 13, 1942 |
| 2,646,151 | Wellman et al. | July 21, 1953 |

FOREIGN PATENTS

| | | |
|---|---|---|
| 557,537 | Great Britain | Nov. 24, 1943 |